(12) United States Patent  (10) Patent No.: US 6,803,988 B2
Nakano et al.  (45) Date of Patent: Oct. 12, 2004

(54) FIELD FLATTENER FOR FLATTENING A BENT IMAGE SURFACE

(75) Inventors: Takayuki Nakano, Tokyo (JP); Yasuhisa Tamagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/204,223
(22) PCT Filed: Dec. 19, 2000
(86) PCT No.: PCT/JP00/08999
§ 371 (c)(1), (2), (4) Date: Aug. 19, 2002
(87) PCT Pub. No.: WO02/50596
PCT Pub. Date: Jun. 27, 2002

(65) Prior Publication Data
US 2003/0053032 A1 Mar. 20, 2003

(51) Int. Cl.⁷ .............................. G03B 1/00; G02B 27/42
(52) U.S. Cl. ........................................ 352/244; 359/558
(58) Field of Search ................................. 359/558, 565, 359/569, 572; 352/244

(56) References Cited

U.S. PATENT DOCUMENTS 2,952,180 A 9/1960 Estes
5,153,778 A 10/1992 Sasian-Alvarado
5,526,182 A * 6/1996 Jewell et al. ............... 359/621
6,262,844 B1 * 7/2001 Soskind ...................... 359/565

FOREIGN PATENT DOCUMENTS

| EP | 521624 A | 1/1993 |
| JP | 59-101610 A | 6/1984 |
| JP | 7056083 A | 1/1993 |
| JP | 6-222262 A | 8/1994 |
| WO | WO 00/38249 A1 | 6/2000 |
| WO | WO 00/52511 A1 | 9/2000 |

* cited by examiner

Primary Examiner—Russell Adams
Assistant Examiner—Arthur Smith
(74) Attorney, Agent, or Firm—Birch, Stewart, Kolasch & Birch, LLP

(57) ABSTRACT

A field flattener having a function of flattening a bent image surface on which an image is formed through an optical system, is composed of a material of which a refractive index is equal to or larger than 2. A sectional configuration of the field flattener cut in an optical-axis direction containing the optical axis is formed to take a stepped shape toward its peripheral edge from the optical axis. An axial height of the stepped portion configuring the surface in the optical-axis direction in this stepped shape is set so as to equal to or larger than twice a wavelength of beams to be used.

14 Claims, 3 Drawing Sheets

FIELD FLATTENER FOR FLATTENING A BENT IMAGE SURFACE

This application is the national phase under 35 U.S.C. §371 of PCT International Application No. PCT/JP00/08999 which has an International filing date of Dec. 19, 2000, which designated the United States of America.

TECHNICAL FIELD

The present invention generally relates to a field flattener used in an image forming optical system for a camera, or the like, and more particularly to a field flattener for flattening a bent image surface.

BACKGROUND ART

Generally in an image forming optical system, it is known from Petzval's theorem that an image surface is bent when Petzval's sum $\Sigma$ is not 0, $\Sigma$ being expressed as follows:

$$\Sigma = -\sum_i (1/n_i - 1/n_{i-1})/r_i$$

where $r_i$ is a radius of curvature of an i-th surface of an optical element constituting an optical system, and $n_i$ is a refractive index. A film for a camera or a detector normally take a plane shape and are therefore incapable of being coincident with the bent image surface described above, and a different therebetween appears to be a blur of the image with the result that an image quality considerably declines. This leads to the use of an optical element called a field flattener having a function of removing a curvature of field.

FIG. 5 is an illustration of a field flattener shown in, e.g., Rundolf Kingslake, "Lens Design Fundamentals" (issued by Academic Press, Inc., 1978). In FIG. 5, the numeral 1 represents an image forming optical system, and a curvature of field is seen on the image surface in the case of using only this optical system. The numeral 2 denotes a field flattener and has a function of removing the curvature of field caused by the image forming optical system 1. The numeral 3 represents an image surface becoming a plane surface into which the curvature of field has been removed by the field flattener 2.

The conventional field flattener is designed based on Petzval's sum. Namely, when Petzval's sum held by the image forming optical system 1 is $\Sigma_{opt}$, a configuration is designed so that Petzval's sum held by the field flattener 2 becomes $-\Sigma_{opt}$, whereby Petzval's sum as a whole becomes 0 and the curvature on the image surface 3 is removed in a third-order aberration range. For instance, when the field flattener 2 is configured so that an object-sided surface thereof has a curvature radius $r_{ff}$, and an image-sided surface is formed as a plane surface, the curvature radius $r_{ff}$ may be set as follows:

$$r_{ff} = \frac{1}{\sum_{opt}} \left( \frac{1}{n} - \frac{1}{n_o} \right)$$

One-sided surface or double surfaces of the conventional field flattener 2 are constructed of spherical surfaces, wherein an image surface is flattened by changing a focal position by use of refractive power. In this case, the image-sided surface of the field flattener 2 is formed as a flat surface, while the object-sided surface is formed as a spherical surface, and the field flattener 2, when being fitted closely to the image surface, functions only as an optical element eliminating the curvature of field within the third-order aberration range. If even one of the three conditions described above is not met, however, the refractive power possessed by the field flattener 2 also exerts an influence on an image forming performance, resulting in a problem of an occurrence of a new aberration. Especially when using a detector for capturing an image, the field flattener 2 can not be closely fitted to the detector, and therefore a new aberration occurs, resulting in a decline of image quality.

The present invention, which has been devised to solve the problems described above, aims at obtaining a field flattener that causes no aberration due to the refractive power.

DISCLOSURE OF THE INVENTION

A field flattener having a function of flattening a bent image surface on which an image is formed through an image forming optical system according to the present invention, is characterized in that a refractive index of a material constituting the field flattener is equal to or larger than 2, a sectional configuration of the field flattener cut in an optical-axis direction containing an optical axis is formed to take a stepped shape toward a peripheral edge thereof from the optical axis, and an axial height of a stepped portion configuring a surface in the optical-axis direction in this stepped shape is equal to or larger than twice a wavelength of beams to be used. With this configuration, a distance up to an image forming point of the beams passing through the center of the field flattener and a distance up to an image forming point of the beams passing through a portion away from the center of the field flattener, are uniformized, and an aberration due to the image forming optical system is corrected, thereby obtaining a flattened image surface though its section assumes a saw-tooth shape. Further, the refractive index of the material constituting the field flattener is equal to or larger than 2, whereby a deviation from the plane surface within the image surface taking the saw-tooth shape can be reduced, and an image blur can be restrained within an allowable range.

Note that the above expression that "the sectional configuration of the field flattener cut in the optical-axis direction containing the optical axis is formed to take the stepped shape toward the peripheral edge thereof from the optical axis", includes a case where steps in the stepped shape are formed on only one of an object-sided surface and an image-sided surface of the field flattener (the other surface of the field flattener is formed with no step in the stepped shape in this case), and a case where the steps in the stepped shape are distributed to both of the object- and image-sided surfaces of the field flattener. Further, "the axial height of the stepped portion configuring the surface in the optical-axis direction in this stepped shape" is an addition of axial heights of the stepped portions formed on both surfaces in the case where the steps in the stepped shape are formed in distribution to both of the object- and image-sided surfaces of the field flattener as described above.

Moreover, in the field flattener described above, an axial height d of the stepped portion configuring the surface in the optical-axis direction in the stepped shape of the field flattener is equal to or larger than twice a wavelength of beams to be used, and the field flattener is designed to meet the following formula:

$$d \le \frac{2n_o n}{n - n_o} FD$$

where F is an F-value of the image forming optical system, D is a diameter of a spot size of an allowable blur, n is a refractive index of a material constituting the field flattener, and $n_o$ is a refractive index of the atmospheric air. An image surface in a flat shape with a blur which is caused by the stepped portion falling within the allowable range can be thereby obtained.

Further, a difference $\Delta r_m$ between a radius $r_{m+1}$ of an (m+1)th stepped portion in the stepped shape of the field flattener and a radius $r_m$ of the m-th stepped portion therein is designed to meet the following formula:

$$\Delta r_m \le 2(\sqrt{m+1} - \sqrt{m})\sqrt{RFD}\left(1 - \frac{l}{f}\right)$$

where F is the F-value of the image forming optical system, f is a focal length, R is a radius of curvature of a bent image surface when the field flattener is not provided, l is an interval between the image surface and the field flattener, and D is the diameter of the spot size of the allowable blur. An image surface in a much flatter configuration can be thereby obtained.

Furthermore, in the field flattener described above, an annular zone portion configuring a surface in a direction orthogonal to the optical axis in the stepped shape may be formed as a curved surface. With this configuration, aberrations such as a coma etc. are reduced, and an image forming performance can be improved.

Moreover, in the field flattener described above, the stepped portion configuring the surface in the optical-axis direction in the stepped shape may be formed in parallel to principal beam passing through the stepped portion. With this configuration, the beams traveling through the stepped portion can be minimized, and a decline of contrast due to stray light can be restrained.

Germanium, silicon or chalcogenide glass is suited as a material constituting the field flattener.

Further, in the field flattener, the thinnest portion may be formed with a through-hole. With this configuration, an aberration, which is, though small, caused by the flat plate, can be completely removed, and it is possible to avoid a decrease in transmissivity that will become a problem in the case of using a material exhibiting a large absorption.

Moreover, in the field flattener described above, the stepped shape can be processed by etching. With this configuration, the stepped shape can be processed at a high precision, and a multiplicity of field flatteners can be simultaneously processed and can be efficiently produced.

BEST MODE FOR CARRYING OUT THE INVENTION

Embodiment 1

Figure 1:
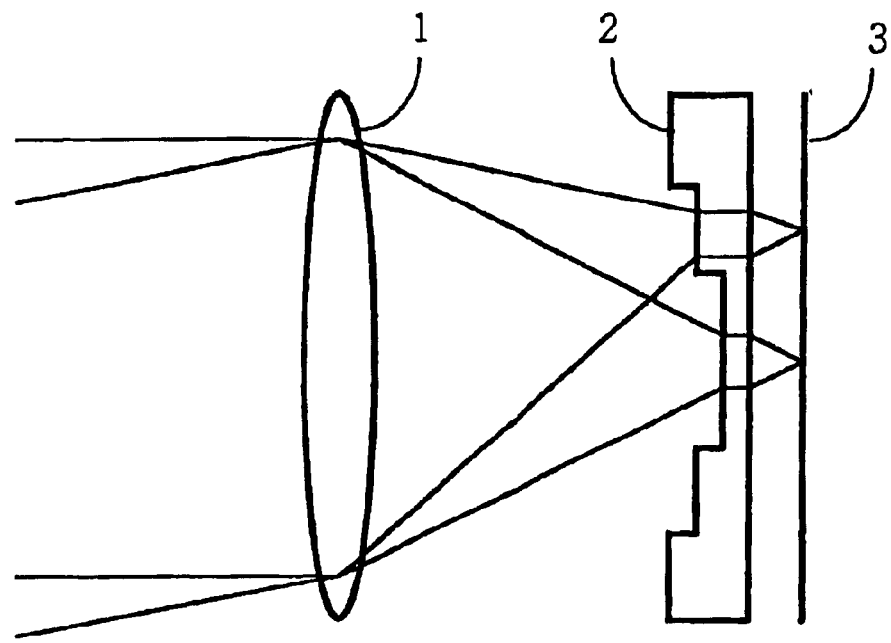
FIG. 1 is an explanatory view showing a structure of a field flattener in Embodiment 1 of the present invention.
Figure 2:
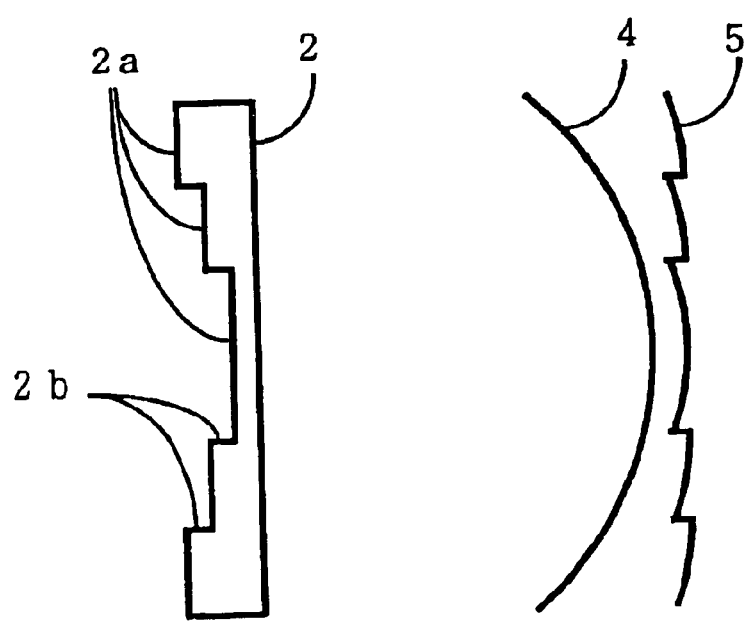
FIG. 2 is an explanatory view showing a correcting function of the field flattener when an image surface is bent on an object side.

In FIGS. 1 and 2, the numeral 1 represents an image forming optical system, and 2 denotes a field flattener having a function of removing a curvature of field caused by the image forming optical system 1. The numeral 3 represents an imaginary modified image surface in the case of being idealistically flattened by the field flattener 2, 4 designates an image surface in the case of providing no field flattener, and 5 stands for a real image surface modified by the field flattener 2 in Embodiment 1. Note that FIG. 2 illustrates how the image surface is corrected in a way that disposes the field flattener 2 of FIG. 1 and the image surfaces 4, 5 facing to each other.

As can be understood from FIGS. 1 and 2, a sectional configuration of the field flattener 2 when cut in an optical-axis direction containing the optical axis, is that the field flattener 2 is so formed as to be thinnest at a central portion peripheral to the optical axis and to have a stepped-shape becoming thicker as it gets closer to its peripheral edge from the optical axis. Note that, in this description, stepped surfaces, formed in the direction orthogonal to the optical axis, in the stepped-shape are called annular zone portions 2a, and stepped surfaces formed in the optical-axis direction in the stepped-shape described above are called stepped portions 2b.

Then, in this case, the surface configuring the stepped portion 2b is formed so as to take a cylindrical configuration about the optical axis serving as the central axis in Embodiment 1. Further, an axial height of the stepped portion forming the surface in the optical-axis direction in the stepped-shape is set to be larger than a wavelength of beams to be used.

In the case of using only the image forming optical system, a curvature of field is seen as on the image surface 4 in FIG. 2. However, the use of the thus constructed field flattener 2 schemes to uniformize, between the optical axis and the peripheral portions thereto, distances up to an image forming point and to thus correct an aberration in the image forming optical system, thereby removing the curvature of field into a plane shape as on the image surface 3 in FIG. 1. Note that the field flattener 2 is designed, as a matter of fact, to correct the distances to the imaging forming point by forming the section of the field flattener 2 in the stepped-shape, and hence realistically the curvature of field is corrected into a saw-tooth shape as on the image surface 5 in FIG. 2.

This point will be explained in greater detail. Generally, after being propagated by a length l through a medium having a refractive index n, a focal position moves more backward by $(1/n_0 - 1/n) \times l$ than in propagation through only the air. In Embodiment 1, the beams exhibiting a higher image height passing through an area away from the center of the field flattener 2, travel through a thicker portion, and the focal position moves corresponding thereto. Accordingly, it follows that the distances to the image forming point are uniformized, and the image surface moves more backward as it gets closer to the peripheral edge. As a result, it becomes the image surface 5 of which the section is corrected into the saw-tooth shape corresponding to the stepped-shape of the field flattener 2.

A deviation from the plane surface in this saw-tooth shape causes a blur in the image. Note that the deviation from the plane surface in this saw-tooth shape is related to a radius of the annular zone portion 2a and a height of the stepped portion 2b of the field flattener 2. It is therefore required that the radius of the annular zone portion 2a and the height of the stepped portion 2b of the field flattener 2 be designed to fall within an allowable range of the image blur occurred on the corrected image surface 5. Note that the image surfaces 4, 5 are depicted in FIG. 2 in exaggeration of an influence by the aberration in the image forming optical system. Further, the annular zone portion 2a of the field flattener 2 in Embodiment 1 has the plane shape having no refractive power, and therefore a new aberration does not occur without exerting any influence upon an image forming performance.

Figure 3:
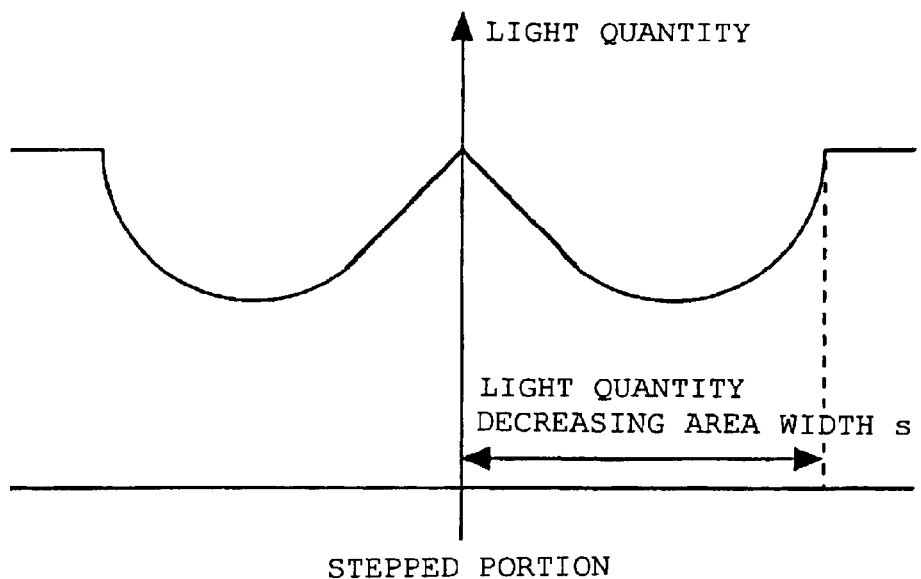
FIG. 3 is an explanatory graph showing a decrease in light quantity due to an influence by a stepped portion of the field flattener shown in FIG. 1.

Next, a further discussion on the influence of the stepped portion 2b described above will be made. The beams traveling through the stepped portion 2b possessed by the field flattener 2 in this embodiment become beams of stray light, wherein a quantity of light contributing to forming the image decreases. FIG. 3 shows how the light quantity decreases due to the influence by the stepped portion 2b, wherein the quantity of light contributing to forming the image decreases on both sides of the stepped portion 2b. It is required that the height of the stepped portion 2b be decreased in order for a light-quantity-decrease area width s to be smaller than the allowable blur area. For attaining this, the refractive index of the field flattener 2 is required to be at least equal to or larger than 2. Materials that meet this condition are, for instance, germanium of which a refractive index is approximately 4 in the infrared-ray area, silicon of which a refractive index is approximately 3.4 therein, and chalcogenide glass of which a refractive index is about 2.5 therein, and hence these materials are, it can be said, suited to materials for the field flattener 2.

The configuration of the field flattener 2 in Embodiment 1 can be approximately designed by, e.g., the following method. An allowable difference $\delta$ between the focal positions is given by:

$$\delta \leq 2FD$$

where F is an F-value of the image forming optical system 1, and D is a diameter of a spot size of the allowable blur. This becomes a maximum allowable difference between the focal positions, i.e., a height of the edge portion of the saw-tooth shape in the corrected image surface 5. On the other hand, there occurs a step difference corresponding to the difference $\delta$ between the focal positions which is given by:

$$\delta = \left(\frac{1}{n_o} - \frac{1}{n}\right)d$$

where n is a refractive index of the field flattener 2, $n_0$ is a refractive index of the atmospheric air and d is a height of the stepped portion 2b of the field flattener 2. From the above, the height d of the stepped portion 2b that the field flattener 2 is allowed to have, is given as follows:

$$d \leq \frac{2n_o n}{n - n_o} FD$$

Note that if the height d of the stepped portion 2b is substantially the same as the wavelength of the beams to be used, a phenomenon of diffraction appears, with the result that the stray light occurs and a loss of the light quantity is caused. It is therefore required that the height d be set so as to be well larger than the wavelength of the beams to be used, for example at least equal to or more than twice the wavelength of the beams to be used.

Figure 4:
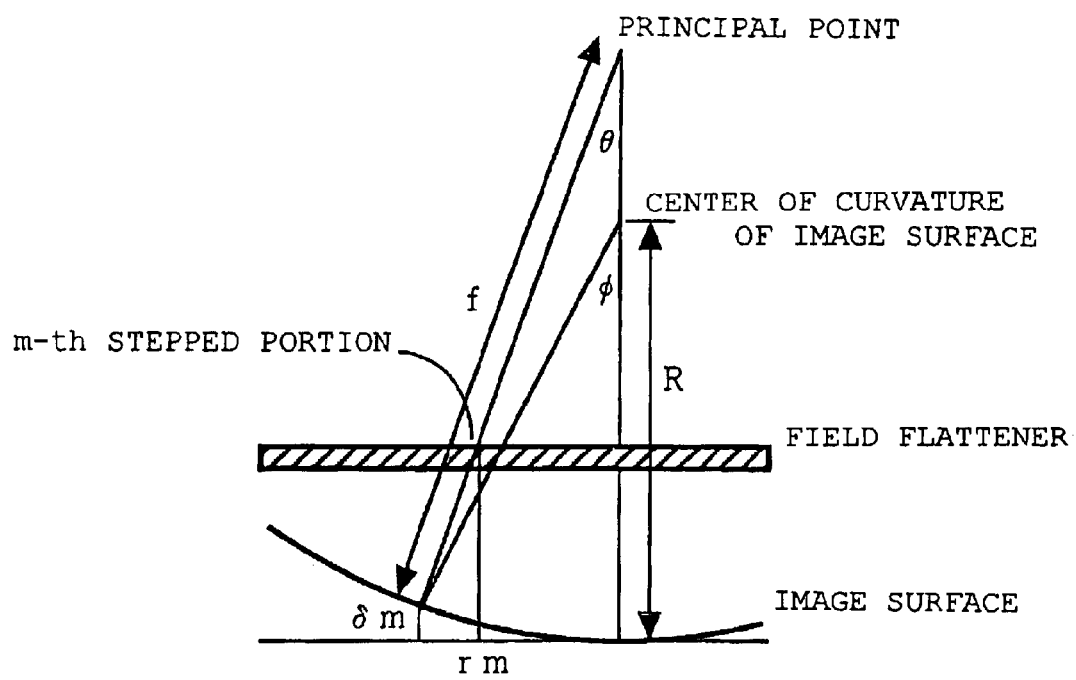
FIG. 4 is an explanatory diagram showing light paths through an m-th stepped portion.
Figure 5:
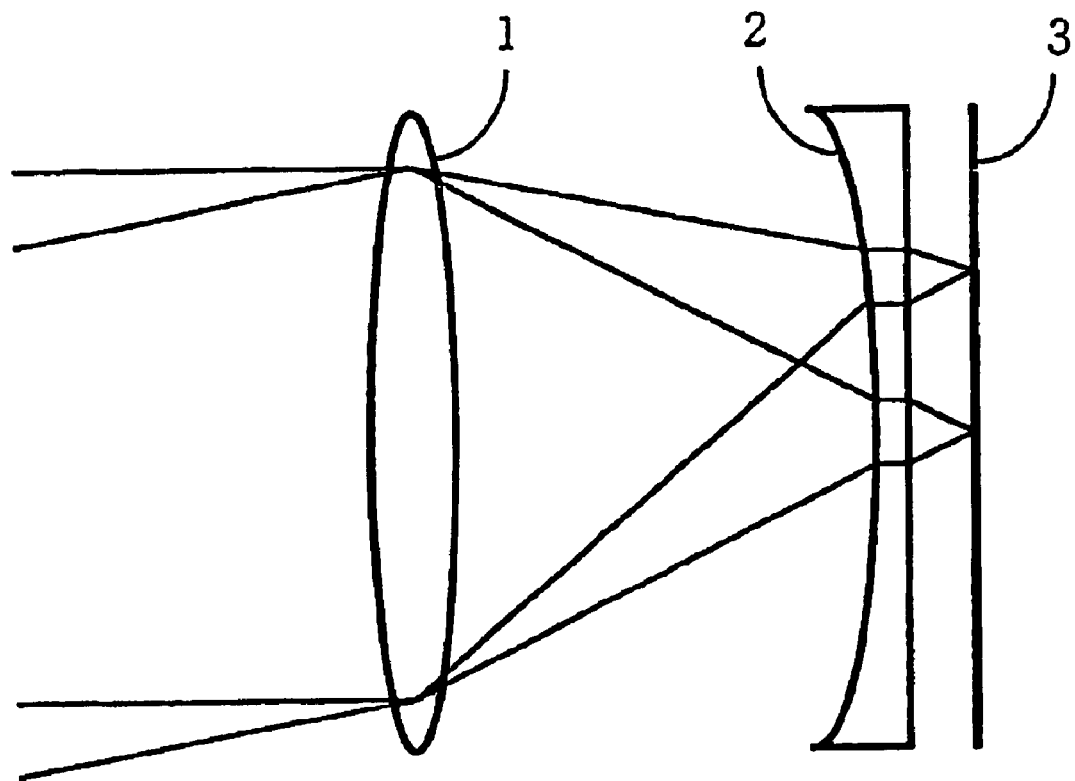
FIG. 5 is a structural view showing one example of a conventional field flattener.

Further, radius $r_m$ of an m-th stepped portion 2b can be designed, for instance, as follows. FIG. 4 shows a diagram of light paths. The difference $\delta$ between the focal positions from the plane surface is given by:

$$\delta = R(1 - \cos\phi)$$

where R is a radius of curvature of the bent image surface 4, and $\phi$ is an angle at which an image point is viewed from the center of curvature. As described above, the allowable difference between the focal positions in each stepped portion 2b is equal to or smaller than 2FD. Accordingly, the allowable difference $\delta_m$ between the focal positions in the m-th stepped portion 2b is given by:

$$\delta_m \leq 2mFD$$

The radius $r_m$ of the stepped portion is expressed as follows:

$$r_m = (f - l)\tan\theta$$

where f is a focal length of the optical system, l is an interval between the image surface and the field flattener, and $\theta$ is an angle at which the m-th stepped portion is viewed from a principal point on the image side.

On the other hand, the angle $\theta$ and the angle $\phi$ approximately have a relationship such as:

$$f \tan\theta \approx R \tan\phi$$

Therefore, eventually the following relationship is established:

$$r_m \leq 2\sqrt{mRFD}\left(1 - \frac{l}{f}\right)$$

As a result, a difference $\Delta r_m$ between a radius $r_{m+1}$ of an (m+1)th stepped portion and the radius $r_m$ of the m-th stepped portion, which is used to determine the radius of the annular zone portion 2a described above is given by:

$$\Delta r_m \leq 2(\sqrt{m+1} - \sqrt{m})\sqrt{RFD}\left(1 - \frac{l}{f}\right)$$

The case where the image surface is bent on the object side has been exemplified in the discussion made above. However, if the image surface is bent on the opposite side, the sectional configuration of the field flattener cut in the optical-axis direction containing the optical axis may be structured so that the center is thick, while the field flattener becomes thinner as it gets closer to the peripheral edge. Further, the thickness of each of the portions of the field flattener can be set in the same way with respect to other configurations. Namely, the portion through which the beams pass for forming the image in the position where the image surface is bent on the object side, may be formed to be thick, while the portion through which the beams pass for forming the image in the position where it is bent on the opposite side, may be formed to be thin.

Embodiment 2

In Embodiment 1, the stepped shape of the field flattener 2 is provided on the object-sided surface. However, the same effect is obtained even when providing the stepped shape on the image-sided surface. Alternatively, the same effect is obtained by a double-surface stepped shape in which the height of the stepped portion 2b is distributed to the object-sided surface and to the image-sided surface. In this case, the height d of the stepped portion 2b described above may be sum total of the height of the stepped portion on the object-sided surface and the height of the stepped portion on the image-sided surface.

Embodiment 3

In Embodiments 1 and 2, the annular zone portion 2a of the field flattener 2 is formed as the plane surface but may also be formed as a curved surface. Further, one-sided surface (opposite to the surface formed with the stepped shape, i.e., formed with no stepped shape) of the field flattener 2 is formed as the plane surface but may also be formed as the curved surface.

As described above, the annular zone portion and the one-sided surface are formed as the curved surfaces, whereby the aberrations such as a coma etc. are reduced, and the image forming performance can be improved.

Embodiment 4

In Embodiments 1 through 3, the stepped portion 2b of the field flattener 2 is formed in the cylindrical shape with the optical axis serving as the central axis but may also be formed as a surface parallel to the principal beam traveling through this portion, i.e., a curved surface in a conical shape. With this configuration, the beams of light passing through the stepped portion and becoming the stray light decrease, and the quantity of light that does not contribute to forming the image decreases. The surface forming the stepped portion is thus set to be parallel to the principal beam, whereby the beams passing through the stepped portion can be minimized and a decline of contrast due to the stray light can be restrained.

Embodiment 5

The thinnest portion of the field flattener 2 in Embodiments 1 through 4 may be formed with a through-hole. For example, in the case where the image surface is bent on the object side, Embodiment 1 involves the use of the field flattener of which the central portion is thinnest, but this portion may be formed with the through-hole. With this contrivance, it is possible to completely eliminate an aberration that, though small, occurs due to the flat plate of the central portion in the case where the central portion is not formed with the through-hole. Further, a decrease in transmissivity, which is a problem in the case of using a material exhibiting a large absorption, can be avoided.

Embodiment 6

In the field flattener 2 in Embodiments 1 to 5, the stepped shape can be processed by etching. The field flattener 2 is processed by etching, which enables processings of a multiplicity of field flatteners 2 simultaneously at a high precision, and the field flatteners 2 can be therefore produced efficiently.

Industrial Applicability

As described above, the field flattener according to the present invention can be applied to the use in a wide range, which requires flattening of the bent image surface, from a microscope to a far distance communication system.

What is claimed is:

1. A field flattener for flattening a bent image surface on which an image is formed through an optical system,
   wherein a refractive index of a material that forms the field flattener is equal to or larger than 2,
   wherein a sectional configuration of the field flattener that is cut in an optical-axis direction and contains an optical axis is formed to have a stepped shape extending towards a peripheral edge thereof from the optical axis, and
   wherein an axial height of a stepped portion configuring a surface in the optical-axis direction in this stepped shape is equal to or larger than twice a wavelength of beams to be used.

2. The field flattener according to claim 1, wherein, in said field flattener, an axial height d of the stepped portion configuring the surface in the optical-axis direction in the stepped shape of said field flattener is equal to or larger than twice a wavelength of beams to be used, and said field flattener is designed to meet the following relationship:

$$d \leq \frac{2n_o n}{n - n_o} FD$$

where F is an F-value of an image forming optical system, D is a diameter of a spot size of an allowable blur, n is a refractive index of said field flattener, and $n_0$ is a refractive index of atmospheric air.

3. The field flattener according to claim 1, wherein, in said field flattener, a difference $\Delta r_m$ between radius $r_{m+1}$ of an (m+1)th stepped portion in the stepped shape of said field flattener and a radius $r_m$ of an m-th stepped portion therein is designed to meet the following relationship:

$$\Delta r_m \leq 2(\sqrt{m+1} - \sqrt{m})\sqrt{RFD}\left(1 - \frac{l}{f}\right)$$

where F is the F-value of the image forming optical system, f is a focal length, R is a radius of curvature of a bent image surface when said field flattener is not provided, l is an interval between the image surface and the field flattener, and D is a diameter of a spot size of an allowable blur.

4. The field flattener according to claim 2, wherein, in said field flattener, a difference $\Delta r_m$ between a radius $r_{m+1}$ of an (m+1)th stepped portion in the stepped shape of said field flattener and a radius $r_m$ of an m-th stepped portion therein is designed to meet the following relationship:

$$\Delta r_m \leq 2(\sqrt{m+1} - \sqrt{m})\sqrt{RFD}\left(1 - \frac{l}{f}\right)$$

where F is the F-value of the image forming optical system, f is a focal length, R is a radius of curvature of a bent image surface when said field flattener is not provided, l is an interval between the image surface and the field flattener, and D is the diameter of the spot size of the allowable blur.

5. The field flattener according to claim 1, wherein, in said field flattener, an annular zone portion configuring a surface in a direction orthogonal to the optical axis in said stepped shape is formed as a curved surface.

6. The field flattener according to claim 1, wherein, in said field flattener, the stepped portion configuring the surface in the optical-axis direction in said stepped shape is formed in parallel to principal beam passing through the stepped portion.

7. The field flattener according to claim 1, wherein, in said field flattener, a central portion peripheral to the optical axis with a thickness thereof made thinnest is formed with a through-hole.

8. The field flattener according to claim 1, wherein, in said field flattener, geranium is used as a material constituting said field flattener.

9. The field flattener according to claim 1, wherein, in said field flattener, silicon is used as a material constituting said field flattener.

10. The field flattener according to claim 1, wherein, in said field flattener, chalcogenide glass is used as a material constituting said field flattener.

11. The field flattener according to claim 1, wherein, in said field flattener, said stepped shape can be formed by etching.

12. A field flattener comprising:
   a first surface for receiving and correcting a light beam, the first surface being formed of a material having a refractive index of at least 2 and being formed in a step-shaped manner such that each step extends from a central axis of the first surface to a peripheral edge thereof, each step having a predetermined height therebetween, the predetermined height being larger than a wavelength of the light beam; and
   a second surface being located upstream from a light beam receiving unit and downstream from the first surface, the second surface allowing the corrected light beam to pass therethrough.

13. The field flattener according to claim 12, wherein the steps extending from the central axis to the peripheral edge of the first surface extend such that the a thickness of the peripheral edge is greater than a thickness of the central axis.

14. The field flattener according to claim 12, wherein the steps extending from the central axis to the peripheral edge of the first surface extend such that the a thickness of the peripheral edge is less than a thickness of the central axis.

* * * * *